United States Patent [19]

Montanari et al.

[11] Patent Number: 4,695,997
[45] Date of Patent: Sep. 22, 1987

[54] DEVICE FOR PERFORMING WRAP TESTS ON A MULTIPLEX LINK IN A DATA COMMUNICATION SYSTEM

[75] Inventors: Gerard M. Montanari, Cagnes/Mer; Francis E. Baudelot, Nice; Michel L. Costes, Cagnes/Mer, all of France

[73] Assignee: International Business Machines Corp., Armonk, N.Y.

[21] Appl. No.: 744,704

[22] Filed: Jun. 14, 1985

[30] Foreign Application Priority Data

Jun. 29, 1984 [EP]  European Pat. Off. ........ 84430023.6

[51] Int. Cl.⁴ .......................... H04J 1/16; H04M 1/24
[52] U.S. Cl. ......................................... 370/13; 375/10
[58] Field of Search .................... 376/13, 14; 179/125; 375/10

[56] References Cited

U.S. PATENT DOCUMENTS 4,195,206  3/1980  Baichtal .............................. 370/14
4,302,836  11/1987  Bourierd'Iroire et al. .......... 370/13
4,419,751  12/1983  Cholat-Namy et al. ............. 370/13

Primary Examiner—Douglas W. Olms
Assistant Examiner—Frank M. Scutch, III
Attorney, Agent, or Firm—John B. Frisone

[57] ABSTRACT

In a data communication system, a device for performing a wrap test on at least one line without affecting the other lines that transmit and receive data over at least one multiplex link (4) within time slots allocated to a given line within a given frame. During each time slot, a wrap control bit (W) is set by the communication system to a state that indicates either the wrap test mode or the normal mode of operation. Said bit controls a logic circuit (51) to cause data to be sent either over line (4) or to the receive circuit to perform the test, within each time slot.

1 Claim, 5 Drawing Figures

DEVICE FOR PERFORMING WRAP TESTS ON A MULTIPLEX LINK IN A DATA COMMUNICATION SYSTEM

DESCRIPTION

TECHNICAL FIELD

This invention relates to a device for performing a wrap test on at least one line in a multiplex link without affecting the operation of the other lines attached thereto.

BACKGROUND ART

Multiplex links are employed to an ever-increasing degree to reduce the cost of cables used in communication networks.

CCITT Recommendation X22 defines an interface designed to be attached to a communication controller in which the received data and the transmitted data are multiplexed together.

In this type of link, as defined in Recommendation X22, six or eight bits are transferred on a given communication line within each time slot in each frame.

As the maximum bit rate allowed on the multiplex link is 48 kbps, the number of lines that can be attached thereto is dependent on the bit rates used on the individual lines.

In a data communication system, a conventional diagnostic test called a wrap test is performed to check the operation of the circuits associated with a given line. This consists in temporarily connecting the receive interface of the line to its transmit interface to permit comparing the received data with the original data.

However, a problem arises in the case of a multiplex link in that, when a wrap test is being performed on a particular line, the other lines also are in diagnostic wrap mode and, therefore, cannot be used to transfer data.

It is, therefore, an object of this invention to provide a device for performing a wrap test on one or more communication lines attached to a multiplex link without affecting the operation of the other lines attached thereto.

SUMMARY OF THE INVENTION

This invention relates to a device for performing wrap tests in a data communication system comprising at least one multiplex link in which each time slot within each frame is dedicated to the transmission and reception of data bits on a given line. The device provides a means of testing at least one line without affecting the operation of the other lines attached to the same link. The data communication system includes transmission means for sending data bits within each time slot and reception means for receiving data bits from the multiplex link.

The device of the invention includes means for setting a wrap control (W) bit associated with the bits to be sent within each time slot to a first or a second state indicating that the line is in wrap mode or in the normal mode of operation, respectively. Means responsive to the state of the W bit is provided to cause either the data bits received from the transmission means to be sent to the reception means within the time slots during which the W bit is in a first state, or the data bits received from the transmission means to be sent over the multiplex link and the data bits received from the link to be sent to the communication system within those time slots during which said bit is in the second state.

DETAILED DESCRIPTION

The device of the present invention can be used with any communication system that comprises multiplex links. The device is described hereafter in the context of an IBM 3725 Communication Controller that includes the line scanner described in European patent application No. 0077863 published May 4, 1983.

Figure 1:
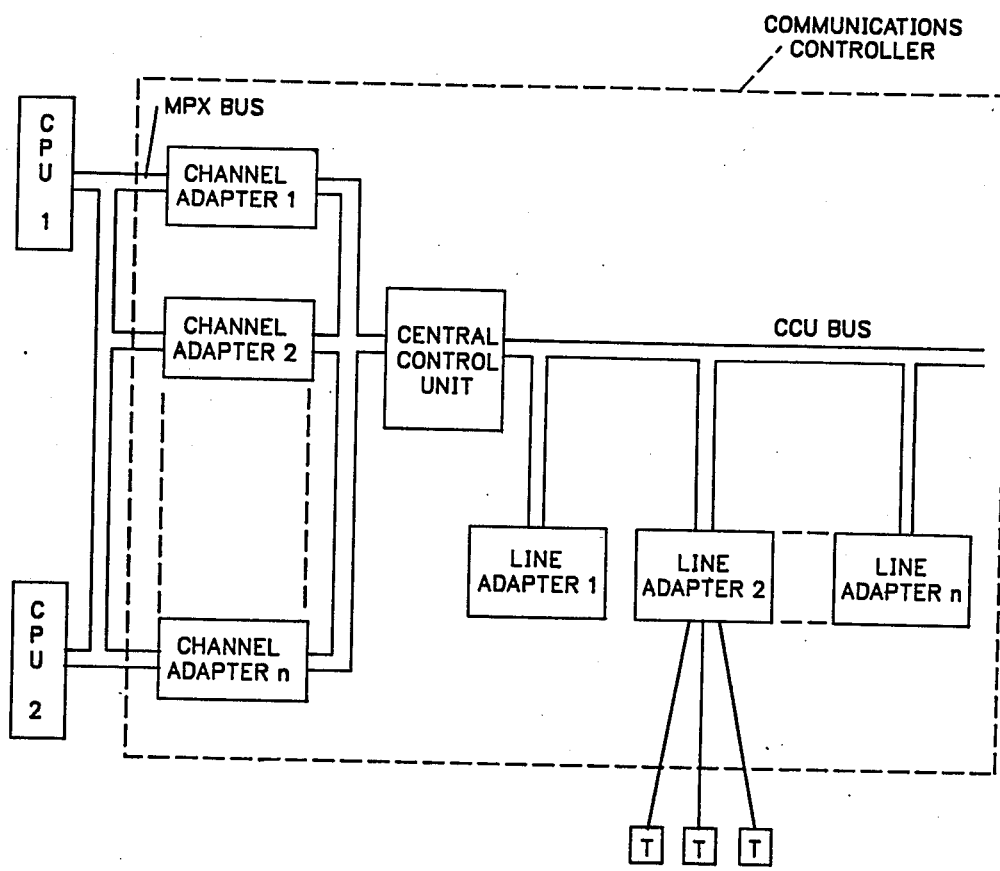
FIG. 1 is a schematic diagram of a communication controller in which the device of the present invention can be incorporated.

As shown in FIG. 1, the communication controller (CC) forms part of a teleprocessing network an exemplary configuration of which is described in the book entitled "Téléinformatique" by G. Macchi and J. E. Guilbert. In the controller, a central control unit (CCU) manages the interchange of data taking place between terminals (T) and central processing units (CPU1 and CPU2). Unit CCU is connected to the multiplex channels (MPX BUS) of CPU1 and CPU2 through channel adapters (CA1 . . . CAn), and is further connected to terminals T through line adapters (LA1 . . . LAn) connected to a bus (CCU BUS).

Figure 2:
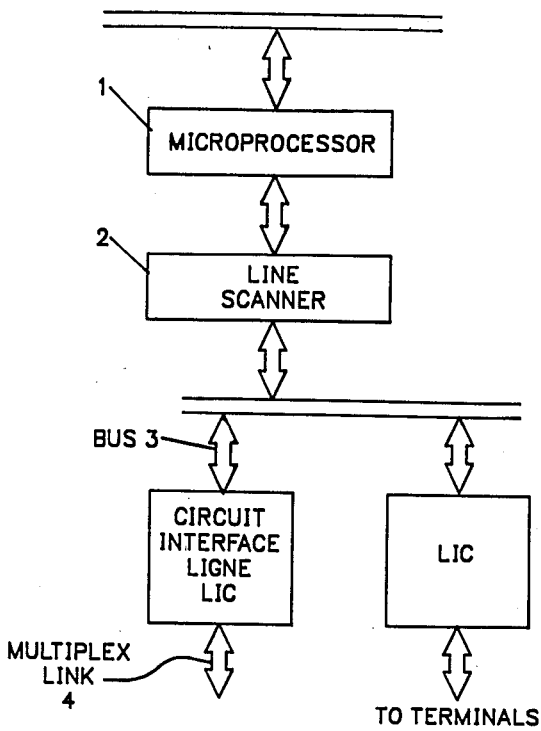
FIG. 2 is a schematic diagram of a line adapter used in the controller of FIG. 1.

Each line adapter is of the type described in the above mentioned patent application and is schematically shown in FIG. 2. As shown, the line adapter comprises a microprocessor 1 and a scanner 2 mainly comprised of memories for temporarily storing the data to be exchanged between the terminals and a CPU, means for serializing/deserializing the data bits transmitted or received, and addressing means for sequentially addressing the communication lines to be scanned.

A number of line interface circuits (LIC) are connected by means of a bus 3 to the scanner to enable data bits to be sent to or received from the addressed lines.

In a controller of this type, each line adapter has an overall bit rate of 256 kbps and can, therefore, manage a number of lines that is dependent on the bit rates used on the individual lines and the storage capacity of the adapter.

Thus, one or more suitable interface circuits can be attached to an adapter to allow data bits to be exchanged over a multiplex link which may be of the type described in CCITT recommendation X22, rather than other specific communication lines.

On multiplex link 4, which is an X22 link, the overall bit rate of 48 kbps can be shared among several communication lines. The number of lines that can be attached to the link is dependent on the bit rate used on each line. For example, five 9600-bps lines, or four 9600-bps lines and two 4800-bps lines, or twenty 2400-bps lines, or any other combination of lines could be attached to the multiplex link, provided the maximum allowable bit rate is not exceeded and is compatible with CCITT Recommendation X54, which defines the authorized configurations.

In each case, at least one time slot within a frame defined by a Frame Start Identification signal (F) is allocated to each line. Each time slot may contain 6 or 8 bits depending on the frequency of a Signal Element Timing signal (S).

Figure 3:
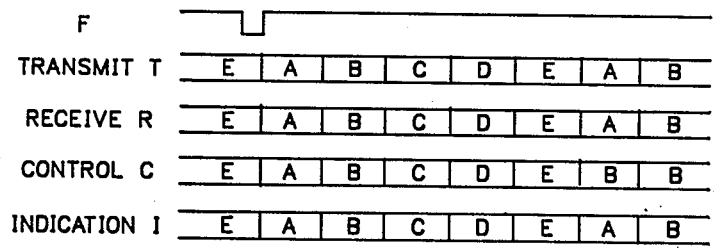
FIG. 3 illustrates by a way of example the allocation of time slots in two different line configurations on the multiplex link.

FIG. 3 illustrates the time slot allocations in the case of a configuration comprised of five 9600-bps lines (A, B, C, D, E) and in that of a configuration comprised of two 4800-bps lines (A1, A2) and four 9600-bps lines (B, C, D, E).

Line interface circuit LIC multiplexes together the data bits to be sent within the time slots and demultiplexes the received data bits.

Figure 4:
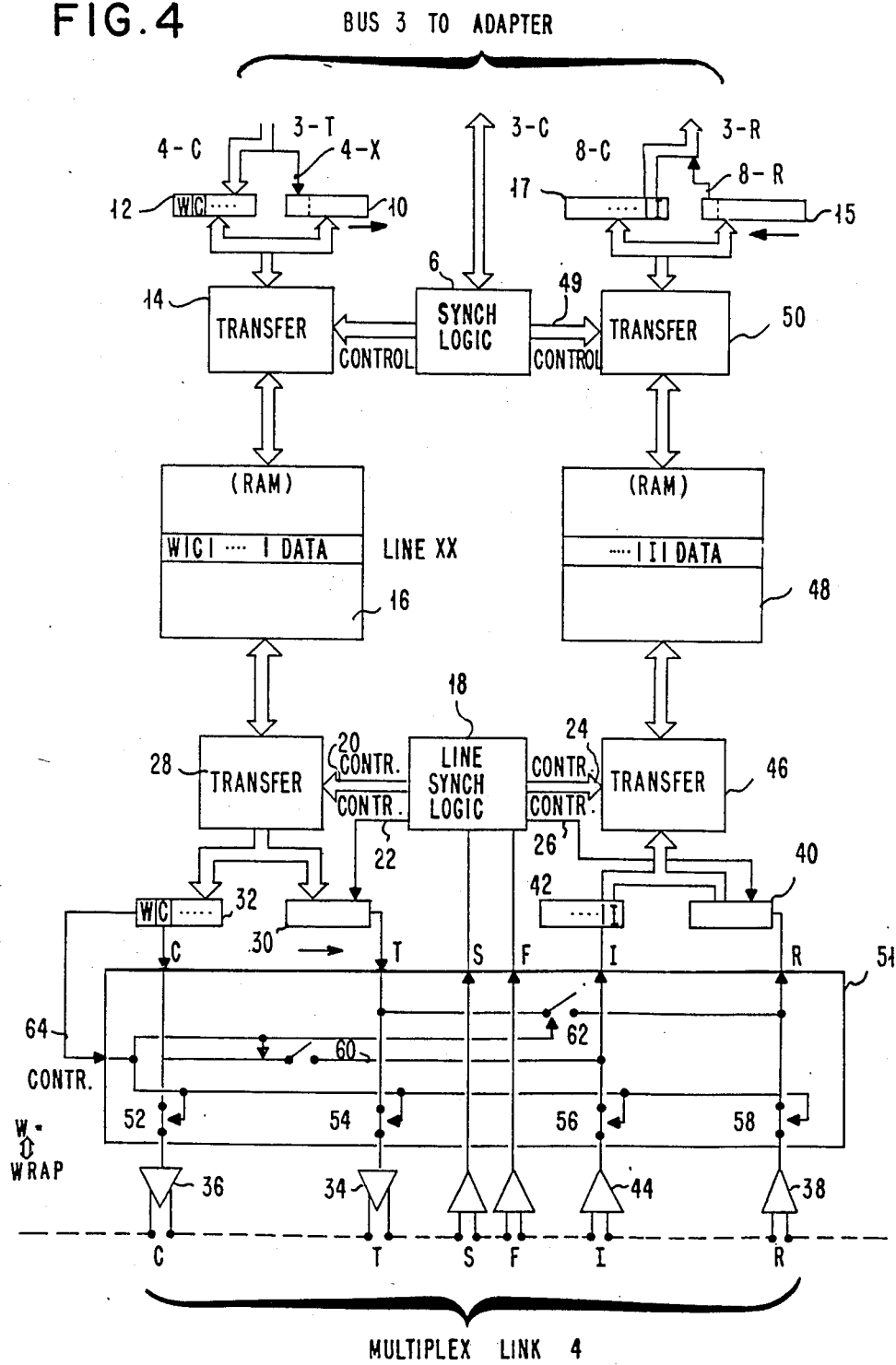
FIG. 4 is a detailed diagram of a line interface circuit in which the device of the invention is incorporated.

FIG. 4 illustrates such a circuit, to which the device of the present invention has been added.

Bus 3 of FIG. 2 is divided up into three parts designated 3-T, 3-C and 3-R. Bus 3-T supplies interface circuit LIC, during each line scan period, with the bit to be sent over wire 4-X of the scanned line and the associated control bits over wires 4-C. Bus 3-C is used to exchange control and synchronization signals such as the line and register address signals, the read or write control signals, etc, between the scanner and the interface circuit. These signals are fed to a synchronization logic 6. Lastly, bus R-3 is used to send to the scanner, during each line scan period, the bit received via wires 8-R and the associated control bits received via wire 8-C.

Wire 4-X is connected to the left most position of a shift register 10 and wires 4-C are connected to a register 12 to store the control bits associated with the bit to be sent.

A transfer circuit 14, which operates under the control of logic circuit 6, causes the contents of registers 10 and 12 to be transferred at appropriate times to an addressed storage area. Each distinct storage area of memory 16 is allocated to a specific line.

A second logic circuit 18, which is used for line synchronization purposes, receives signals S and F from the multiplex link and derives therefrom appropriate control signals which are sent over buses 20, 22, 24 and 26.

The signal placed on bus 20 is applied to a transfer circuit 28 to cause the contents of a storage area addressed by device 28 to be transferred at appropriate times to two output registers 30 and 32. Register 30 is a shift register which receives from memory 16 the data bits to be sent, while register 32 receives the associated control bits.

To this end, device 18 is provided with S and F signal counting means to determine the frames and the time slots within the frames, and with an address pointer which determines the addresses of the areas of memory 16 allocated to the respective lines according to the configuration of lines attached to the link. As shown in FIG. 3, a particular time slot within a frame is allocated to each line.

The signals on control but 22 cause the bits contained in register 30 to be shifted to the right and out of the register in serial fashion for transmission by a driver (DRV) 34 to interface wire T in multiplex link 4.

Control bit C in register 32 is sent by driver 36 to interface wire C in multiplex link 4. In the instance of an X22 interface, only one of the bits in register 32 is used, namely, the C bit defined by CCITT Recommendation X22.

In the receive portion of the circuit, the bits from multiplex link 4 are transferred by a receiver (RCV) 38 to the rightmost position of a shift register 40. These bits are shifted to the left at the frequency of signal S under the control of synchronization circuit 18, by control signals sent over but 26, and are, as a result, deserialized.

In the instance of an X22 interface only one control bit, namely, the Indication bit I defined by CCITT Recommendation X22, is associated with the received bit. Bit I is sent to a register 42 by a receiver 44.

A transfer circuit 46, operating under the control of circuit 18 from which is receives via bus 24 the addresses of the storage areas allocated to the respective lines and, consequently, to the time slots of the multiplex link, causes the contents of registers 42 and 40 to be transferred at appropriate times to the addressed storage areas of a memory 48. An area of memory 48 is allocated to each communication line for storing a byte of data bits and the associated control bits.

A transfer circuit 50, operating under the control of synchronization circuit 6, causes the contents of the storage areas addressed by bus 49 to be transferred at appropriate times to register 15 and 17.

Figure 5:
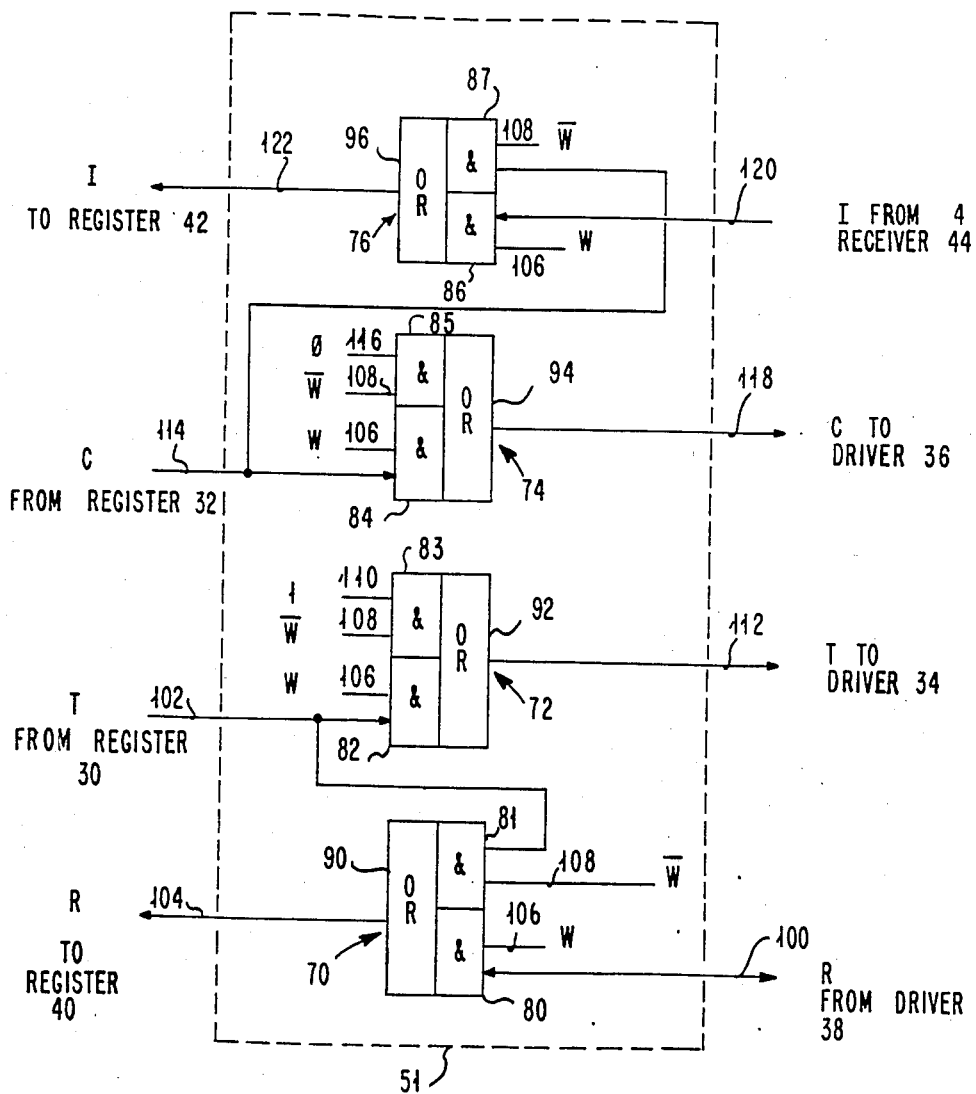
FIG. 5 is a diagram of a logic circuit performing the function of circuit 51 of FIG. 4.

The device of the present invention comprises a logic circuit 51 shown in FIG. 4 as including switches 52, 54, 56, 68, 60 and 62. An equivalent logic circuit which may be used in lieu of circuit 51 is schematically shown in FIG. 5.

In normal operation, switches 52, 54, 56 and 58 are closed and switches 60 and 62 open, as shown in FIG. 4. In wrap test mode, switches 52, 54, 56 and 58 are open and switches 60 and 62 closed.

To perform a wrap test on selected lines without affecting the normal operation of the other lines, a bit W, which is one of the control bits associated with the data bit to be transmitted, is used to control the turning on and off of the switches. This control bit is stored by the controller into register 12 and has a value W or $\overline{W}$ depending on whether a wrap test of the line being scanned is to be performed or not. For example, bit W may be set to 0 if a wrap test is to be performed and to 1 if no test is required.

Bit W is transferred to register 32 and controls the turning on and off of the switches via line 64.

The operation of the line interface circuit of FIG. 4 is as follows.

In the transmit portion of the circuit, during each line scan period, the bit to be sent is stored in the leftmost position of register 10 and the content of the register is shifted one position to the right. The associated control bits are written into register 12, with bit W being set to the appropriate value depending on whether a wrap test of the line being scanned is required or not.

The address of the scanned line is detected by a mechanism (not shown) similar to that described in the previously mentioned European patent application, and logic circuit 6 causes the shifted content of register 10 to be transferred to the storage area of memory 16 allocated to the scanned line.

When the same line is scanned again, the content of the storage area of memory 16 is transferred to register 10, the received bit is stored in the leftmost position of register 10, and the content thereof is shifted one position to the right.

The associated control bits, C and W or $\overline{W}$ are written into register 12 and the contents of registers 10 and 12 are transferred to the memory.

After 6 or 8 line scans, 6 or 8 data bits processed as above will be available in deserialized form to form in the storage area of memory 16 a byte ready to be transmitted in a time slot allocated to that line.

Logic circuit 18 addresses the storage area via bus 20 to cause circuit 28 to transfer the content of said area to output registers 30 and 32, the data bits being sent in serial fashion from register 30 to driver 34 when switch 54 is closed and switch 62 open (no wrap test) and control bit C being sent from register 32 to driver 36 when switch 52 is closed and switch 60 open.

During all time slots allocated to those lines which must be subjected to a wrap test, as indicated by the W bit being 0, switches 52 and 54 will be open and switches 60 and 62 closed, so that the data bits in register 30 will be transferred to shift register 40 in the receive portion to be processed as received data bits for the purpose of the wrap test. Control bit C is used as control bit I for the received bits.

In the receive portion of the circuit, the bits received serially from the multiplex link by receiver 38, or received from register 30 in the case of those lines which must be wrap tested, are deserialized and assembled into 6- or 8-bit bytes in shift register 40, while the associated control bits for each of said lines are stored in register 42.

When a byte is ready, logic circuit 18 causes the byte to be transferred to the storage area of memory 48 allocated to the line for which the byte is destined.

When a given line is scanned by scanner 2 in the line adapter, the bits contained in the storage area of memory 48 allocated to that line are transferred to registers 15 and 17. The bits in register 15 are shifted to the left and the bit in the leftmost position is sent to the scanner along with the associated control bits contained in register 17.

The contents of registers 15 and 17 are then retransferred to the storage area allocated to said line in memory 48.

This process is repeated during each line scan, with the line scanner receiving the 6 or 8 data bits one after the other and processing them as described in the previously mentioned European patent application.

When the 6 or 8 bits have been sent, the byte relating to the next time slot allocated to the line will be assembled in register 40 to be processed as previously explained.

The operations to be performed are the same for al time slots.

Accordingly, the data bits from lines for which a wrap test is required will be analyzed to enable the test to be performed in a conventional manner.

FIG. 5 is a diagram of a logic circuit that can be used to perform the function of circuit 51.

This logic circuit comprises four sets of AND and OR gates 70, 72, 74 and 76 each of which consists of two input AND gates (80, 81; 82, 83; 84, 85; and 86, 87) and one output OR gate (90, 92, 94 and 96), respectively.

Set 70 is used to transmit to register 40 over wire 104 either the bits received from multiplex link 4 by driver 38 over wire 100, or those received from register 30 over wire 102.

Set 76 is used to transmit to register 42 over wire 122 either the I bit received from multiplex link 4 by receiver 44 over wire 120, or the C bit received from register 32 over wire 114.

Sets 72 and 74 are respectively used to transmit to driver 34 over wire 112 the data bits received from register 30 over wire 102, and to transmit to driver 36 over wire 118 the C bit received from register 32 over wire 102.

When the W bit is 1, the circuit is in the normal mode of operation, in which case:

AND gate 80 is open, AND gate 81 is closed, and the bits received from driver 38 are transmitted to register 40.

AND gate 83 is open, and the bit to be transmitted from register 30 are sent to driver 34.

AND gate 84 is open, and the C bit from register 32 is sent to driver 36.

AND gate 86 is open and AND 87 is closed; the I bit from receiver 44 is transmitted to register 42.

When the W bit is 0, the wrap test mode is entered. In this case:

AND gates 82 and 80 are closed and AND gate 81 is open; the bits to be transmitted are sent from register 30 to register 40.

AND gate 83 is open. This gate receives 1's on one of its inputs so that 1's are sent over wire 112 to driver 34 to comply with CCITT Recommendation X22.

AND gates 84 and 86 are closed and AND gate 87 is open, so that bit C from register 32 is sent to register 42.

AND gate 85 is open. This gate receives 0's on one of its inputs so that 0's are sent over wire 118 to driver 36 to comply with CCITT Recommendation X22, as previously.

While the invention has been shown and particularly described with reference to a preferred embodiment, it will be understood by those skilled in the art that various changes in form and detail may be made without departing from the spirit and scope of the invnetion.

What is claimed is:

1. In a communication system for the bidirectional exchange of messages between a central process unit (CPU) and a time multiplexed link serving a number of remote terminals via a communication controller which includes a central control unit (CCU) connected to the CPU and to the time multiplex link via a line adapter (LA) having a line scanner, a device for performing wrap tests on the multiplex line within any given time slot comprising, first means (2, 12) for setting a wrap control bit which is associated with the bits from the CPU to be transmitted within each time slot, to a first or to a second state indicating that the link is either in wrap test mode or in a normal mode of operation, and second means (32, 51) including a logic circuit responsive to the state of said wrap control bit to cause the data bits received from the CPU to be returned to the CPU within those time slots during which said wrap control bit is in a first state ("O") or to cause the data bits received from the CPU to be sent over the multiplex link, and those received from the multiplex link to be sent to the CPU during those time slots within which said wrap control bit is in the second state ("1"), said second means includes:

first input registers (10 and 12) which receive from the line scanner, whenever a line is scanned, the bit to be transmitted over the scanned line and the associated control bits including said wrap control bit, a memory (16) a storage area of which is allocated to each line and which receives, under the control of a transfer circuit (14), the contents of said first registers, so as to assemble the data bytes to be transmitted during the time slots allocated to the lines, first output registers (30, 32) the first of which receives at appropriate times, under the control of a transfer circuit (28) responsive to Frame Start Identification (F) and Signal Element Timing (S) signals from the multiplex link, the data bytes and the associated control bits from the storage areas of said memory, second input registers (40 and 42) which receives from the multiplex link the data bits and the associated control bits, a memory (48) a storage area of which is allocated to each line and whic receives within each time slot under the control of a transfer circuit (46) responsive to the Frame Start Identification and Signal Element Timing signals from the multiplex link, the data bits and the associated control bits, second output registers (15, 17) which receives during each line scan period the content of said storage area through a transfer circuit (50) to thereby deserialize the bits received within each time slot and send said bits, one at a time, to the scanner whenever a line is scanned, said logic circuit including:
- a first set of gates (86, 84, 82, 80) which are closed when the wrap control bit is in said second state to send the data and control bits, except the wrap control bit, contained in said first output registers over the multiplex link and to transfer the bits received from the multiplex link to the second input register, and which are open when said wrap control bit is in said first state, and
- a second set of gates (81, 87) which are closed when the wrap control bit is in the first state and open when said bit is in the second state, to thereby cause the data and control bits, except said wrap control bit, in said first output registers (30, 32) to be transferred to the second input registers (40, 42).

* * * * *